US008678218B2

(12) United States Patent
Roscher et al.

(10) Patent No.: US 8,678,218 B2
(45) Date of Patent: Mar. 25, 2014

(54) FUEL TANK FOR VEHICLES

(71) Applicant: Alfmeier Präzision AG Baugruppen und Systemlösungen, Treuchtlingen (DE)

(72) Inventors: Richard Roscher, Langenaltheim (DE); Jurgen Theissler, Ansbach (DE)

(73) Assignee: Alfmeier Präzision AG Baugruppen und Systemlösungen, Treuchtlingen (DE)

( * ) Notice: Subject to any disclaimer, the term of this patent is extended or adjusted under 35 U.S.C. 154(b) by 0 days.

(21) Appl. No.: 13/739,503

(22) Filed: Jan. 11, 2013

(65) Prior Publication Data

US 2013/0126007 A1 May 23, 2013

Related U.S. Application Data

(63) Continuation of application No. 12/147,966, filed on Jun. 27, 2008, now abandoned.

(30) Foreign Application Priority Data

Jun. 27, 2007 (DE) .......................... 10 2007 030 040
Mar. 18, 2008 (DE) .......................... 10 2008 014 820

(51) Int. Cl.
*B60K 15/035* (2006.01)
(52) U.S. Cl.
CPC ..... *B60K 15/03504* (2013.01); *B60K 15/03519* (2013.01)
USPC ........................... 220/86.2; 141/198; 137/202
(58) Field of Classification Search
CPC ................. B60K 15/03; B60K 15/035; B60K 15/03504; B60K 15/03519
USPC ............... 141/44, 95, 198; 220/86.2; 137/202
See application file for complete search history.

(56) References Cited

U.S. PATENT DOCUMENTS 5,172,714 A   12/1992   Kobayashi et al.
5,577,526 A   11/1996   Kasugai et al.
(Continued)

FOREIGN PATENT DOCUMENTS

EP    1 236 605 A2    9/2002
EP    2008857 A1 *   12/2008    .......... B60K 15/035

OTHER PUBLICATIONS

Citation of Patent Applications.

*Primary Examiner* — Gregory Huson
*Assistant Examiner* — Nicolas A Arnett
(74) *Attorney, Agent, or Firm* — Dority & Manning, P.A.

(57) ABSTRACT

The present disclosure refers to a fuel tank for a vehicle equipped with a valve housing and a ventilation opening that has a ventilation valve placed on an upper opening of the tank and which projects into the tank interior. Additionally, the wall of the valve housing is interspersed with at least one wall opening, and a float has been arranged in the valve housing that can be moved from a resting to a closing position and has a sealing element on its upper end. The float is in a lower place in the valve housing when it is in its resting position and the sealing element releases the ventilation opening. The float, when in a closing position, closes the ventilation opening with its sealing element as soon as the closing level is reached. Furthermore, there is a connecting channel K arranged between the valve interior and the tank interior, ending with an outlet opening located below the closing level in the tank interior, in which case the outlet opening is arranged above all other wall openings directly connected to the tank interior.

14 Claims, 10 Drawing Sheets

(56) References Cited

U.S. PATENT DOCUMENTS

| | | | | |
|---|---|---|---|---|
| 5,590,697 A * | 1/1997 | Benjey et al. | | 141/59 |
| 5,614,665 A * | 3/1997 | Curran et al. | | 73/114.39 |
| 5,647,334 A * | 7/1997 | Miller | | 123/520 |
| 5,657,734 A * | 8/1997 | Sawamoto et al. | | 123/519 |
| 5,687,778 A * | 11/1997 | Harris | | 141/59 |
| 5,694,968 A * | 12/1997 | Devall et al. | | 137/202 |
| 5,829,491 A | 11/1998 | Bennett | | |
| 6,000,426 A * | 12/1999 | Tuckey et al. | | 137/588 |
| 6,089,249 A * | 7/2000 | Thibaut et al. | | 137/202 |
| 6,302,137 B1 * | 10/2001 | Devall | | 137/202 |
| 6,564,821 B1 | 5/2003 | Orenstein et al. | | |
| 6,913,295 B2 | 7/2005 | Kimisawa et al. | | |
| 7,152,638 B2 | 12/2006 | Ganachaud | | |
| 7,188,613 B2 | 3/2007 | Miura et al. | | |
| 7,225,795 B2 * | 6/2007 | Mills | | 123/516 |
| 7,234,452 B2 * | 6/2007 | Mills | | 123/516 |
| 7,448,365 B2 * | 11/2008 | Mills | | 123/516 |
| 2003/0127134 A1 * | 7/2003 | Mills | | 137/202 |
| 2004/0221890 A1 | 11/2004 | Takahashi et al. | | |
| 2005/0284875 A1 | 12/2005 | Kito | | |
| 2006/0130816 A1 * | 6/2006 | Mills | | 123/519 |
| 2006/0213487 A1 * | 9/2006 | Mills | | 123/520 |
| 2006/0225785 A1 | 10/2006 | Oosaki | | |
| 2007/0006919 A1 | 1/2007 | Tagami et al. | | |
| 2007/0068574 A1 | 3/2007 | Kito et al. | | |
| 2008/0041347 A1 * | 2/2008 | Mills | | 123/518 |
| 2009/0000668 A1 | 1/2009 | Roscher et al. | | |
| 2009/0211649 A1 | 8/2009 | Miura et al. | | |

* cited by examiner

FUEL TANK FOR VEHICLES

RELATED APPLICATIONS

The present application is a continuation of co-pending application Ser. No. 12/147,966, filed Jun. 27, 2008. The present application claims the benefit of such application under 35 U.S.C. §120 and incorporates such application herein in its entirety for all purposes.

FIELD

The present disclosure refers to a fuel tank for vehicles.

BACKGROUND

In order to allow a fuel tank to be ventilated or aerated, the tank must be equipped with at least one ventilation valve in a housing and an opening placed on an upper opening of the tank and projecting into the tank. The wall of the valve housing is interspersed with openings so gas or a fuel vapor-air mixture and liquid fuel can flow through the wall. A float that can move from a resting position to a closing position and which carries a sealing element on its upper end has been placed on the valve housing. When the float is in its resting position, the float is located in a lower position in the valve housing, and the sealing element releases the ventilation opening. When the float is in its closing position, the sealing element closes the ventilation opening as soon as a pre-set fuel level is reached, hereinafter named "closing level". When, for example, fuel is supplied to the fuel tank through a filling pipe during the refilling of the tank, gas cannot escape from the tank through the ventilation opening as soon as the closing level is reached. If refilling continues, the fuel level rises initially inside the tank by accumulating inside the tank and finally in the filling pipe as well, which eventually leads to the turning off of the pump nozzle.

As explained in more detail below, such valves function under a so-called refueling hysteresis. In other words, a relatively large quantity of fuel must be consumed for the fuel level to drop to a level such that the float or its sealing element can release the ventilation opening once again.

Therefore, the task of the present disclosure is to suggest an improved fuel tank for a vehicle that improves on the disadvantage mentioned above.

SUMMARY

The above task is solved through a fuel tank according to the present disclosure in such a way that a connecting channel is placed between a valve's interior of a valve housing and the tank interior. This connecting channel ends in the tank interior with an outlet opening located below a closing level. In this case, the outlet opening is arranged above immediately in the wall openings connected to the tank's interior. Hereinafter the terms "above" and "below", unless otherwise indicated, refer to geodetically above and below (in other words, a relative height).

BRIEF DESCRIPTION OF THE DRAWINGS

More details of this design and of other advantageous designs result from the following disclosure enclosed below, which show these diagrammatical drawings.

DETAILED DESCRIPTION OF THE DRAWINGS

Figure 1:
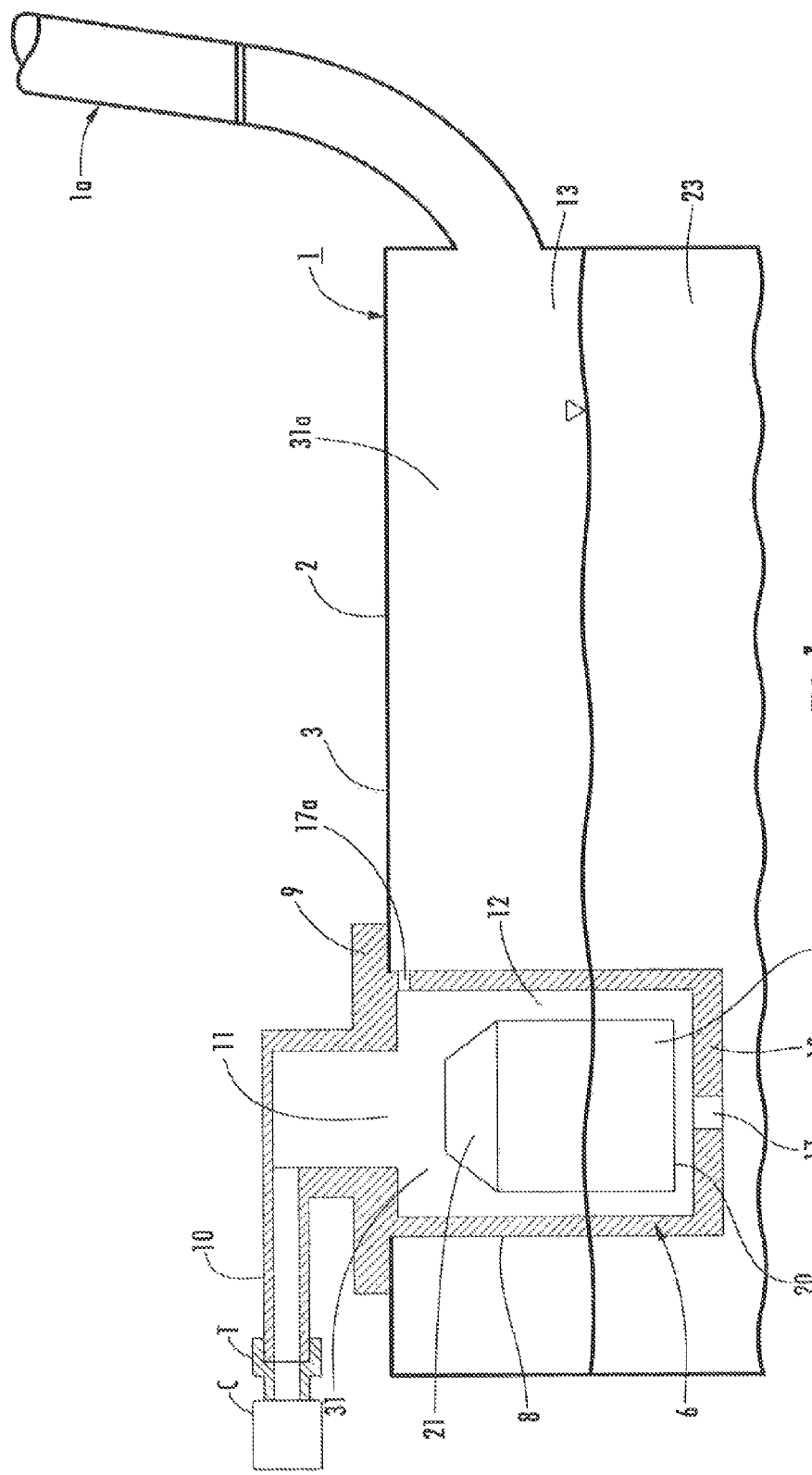
FIG. 1 A conventional fuel tank with an opened ventilation opening.

Detailed reference will now be made to the drawings in which examples embodying the present disclosure are shown. The detailed description uses numeral and letter designations to refer to features in the drawings. Like or similar designations in the drawings and description have been used to refer to like or similar parts of the disclosure.

The drawings and detailed description provide a full and enabling description of the disclosure and the manner and process of making and using it. Each embodiment is provided by way of explanation of the subject matter not limitation thereof. In fact, it will be apparent to those skilled in the art that various modifications and variations may be made to the disclosed subject matter without departing from the scope or spirit of the disclosure. For instance, features illustrated or described as part of one embodiment may be used with another embodiment to yield a still further embodiment.

All drawings show the upper area of a fuel tank 1 enclosed by an upper wall 2. A valve housing 8 with a ventilation valve 6 that projects into the tank interior 13 has been arranged in an opening of the wall 2. The ventilation valve 6 supports itself with a flange 9 on the upper side 3 of the wall 2. A connecting piece 10 has been molded onto the flange 9. On the one hand, the former is fluidically connected to the tank interior 13 via a ventilation opening 11 and on the other hand it can be connected to a ventilation tube (T) that leads to an activated charcoal canister (C). In the wall of the (for example, cylindrical) valve housing 8 there are several wall openings 17 for the inflow and outflow of liquid fuel and gas. A float 19 has been arranged inside the valve housing 8, moveable between a resting position (see FIG. 1, for example) and a closing position (see FIG. 2, for example). When resting, the float is in a lower position, and in this case the ventilation opening 1 is open. In the closed position, the float 19 closes the ventilation opening 11 with the sealing element 21 placed on its upper side. Apart from the ventilation function, the ventilation valve 6 has the additional task of limiting the fuel's filling level during refilling. The ventilation valve can also be designed as roll-over valve, and in this case a pressure spring (not shown) impinges on it in a closing direction.

The filling level limitation of conventional fuel tanks or ventilation valves works in the following way: if the tank is filled with fuel 23 via a filling pipe 1a (FIG. 1) when the float 19 is in the position shown in FIG. 1, the float 19 is lifted by the increasing fuel level. The gas displaced from the tank interior 13 by the inflowing fuel reaches the valve housing 8 through the openings 17 and from there the ventilation opening 11. As soon as the float 19 closes the ventilation opening 11, the gas in the fuel tank displaced by the inflowing fuel can no longer leave the tank through the ventilation opening 11. The level within the ventilation valve 6 in which the float 19 has been raised only so much that the ventilation opening 11 is closed by the sealing element 21, is the closing level 27, which can be calculated or empirically determined for every ventilation valve or type of valve construction.

Figure 2:
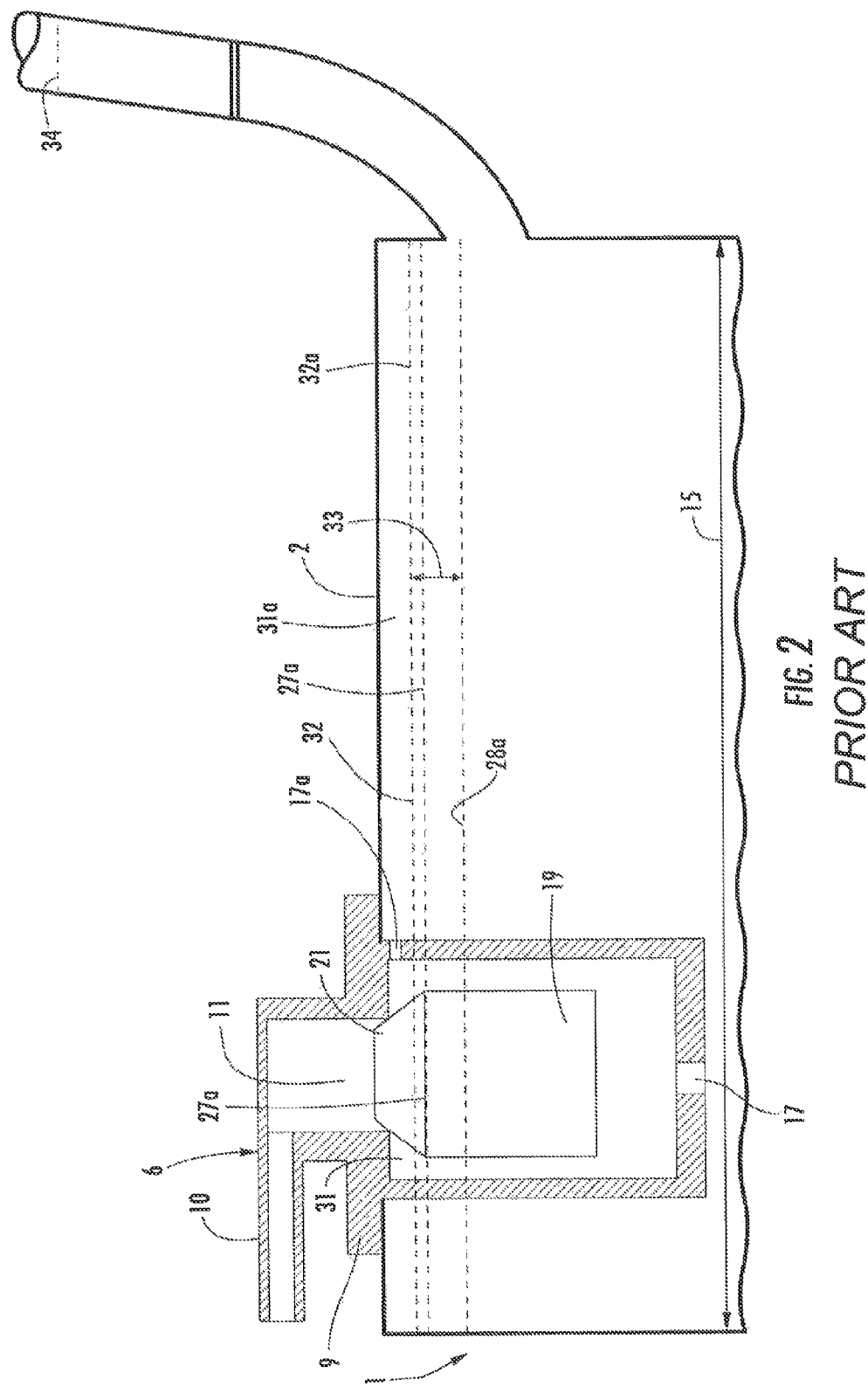
FIG. 2 The fuel tank shown in FIG. 1, but with a closed ventilation opening.

The conventional fuel tank shown in FIGS. 1 and 2 has an uppermost wall opening 17a located above the closing level 27 that leads directly into the tank interior 13. Although the wall opening 17a also forms a connecting channel between the valve and tank interior (12 and 13, respectively), it is placed above the closing level 27. Owing to this height position, the area of the valve interior 13 located above the closing level or a gas cushion 31 found therein are always connected to the gas cushion 31a located above the fuel level of the tank interior 12. Thus, the fuel levels inside and outside the valve housing 8 resemble each other as a result of this design. In the state shown in FIG. 2, for example, a uniform closing level 27a extending over the entire cross-sectional area of the tank interior 13 adjusts itself.

If the closing level 27a is reached during refilling and the ventilation opening 11 is closed, the tank can no longer be filled up. As a result of additional fuel flowing into the tank, the pressure starts rising in the gas cushions 31 and 31a because they have been cut off from the ambient air due to the closed ventilation opening 11 and also because an operational ventilation system (not shown), possibly installed in the tank for ventilating it while the vehicle is running, is closed during refilling. Owing to the pressure increase within the tank, the fuel in the filling pipe 1a rises up to a certain level 34 above the fuel level inside the fuel tank 1, and this turns off the pump nozzle. The fuel level in the fuel tank 1—the turn-off level 32—is higher than the closing level 27a, so that the float 19 dips further into the fuel than at the time the ventilation opening 11 was closed. The dipping of the float 19 is associated with the respective increase in force with which the float 19 presses the sealing element 21 against the ventilation opening 11 or a sealing seat encompassing it. It is especially owing to the overfilling beyond the closing level and a possible excess pressure in the gas cushions 31 and 31a (and evaporating fuel may contribute to its origination), that the re-opening of the ventilation opening 11 is associated with a hysteresis. This means that the float 19 will only open the ventilation opening when the fuel level has dropped to an opening level 28a that lies considerably lower than the closing level 27a. The fuel quantity that must be consumed so the float 19 can once again open the ventilation opening 11 is relatively large. The fuel quantity can reach 6 liters and more and is largely estimated from the inner cross-sectional area 15 of the tank and the distance 33 lying between the opening level 28a and the turn-off level 32a. In the car rental business, this leads to the problem such that when a car is driven for short distances, it is not possible to re-fuel it before returning it to the rental company. Thus, the rental company or next customer will end up paying for the fuel consumed.

Figure 3:
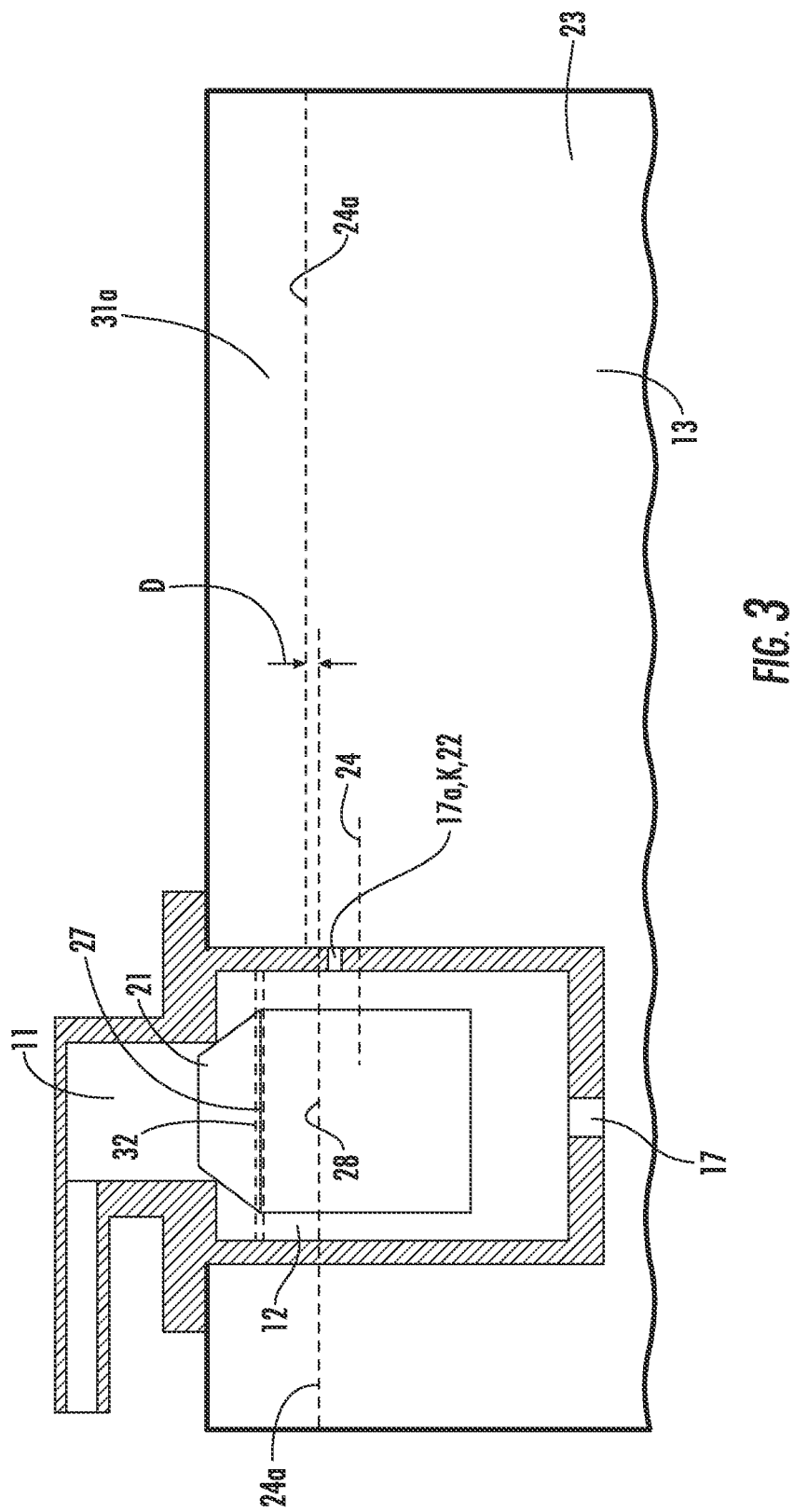
FIG. 3 A first practical design example of a fuel tank according to the present disclosure.

Turning to FIG. 3, the disadvantages described above do not occur with a fuel tank according to the present disclosure because, as already described above, there is a connecting channel K between the valve interior 12 of the valve housing 8 and the tank interior 13 that ends together with an outlet opening 22 located below the fuel closing level 27 (sometimes herein also called a closing level) in the tank interior 13. In this case, the outlet opening 22 has been arranged above other wall openings 17 that connect to the tank interior. With this design, once the outlet opening 22 has been flooded with fuel, the fuel level can only rise by and large within the valve housing 8, so that the dropping fuel level needed for re-opening the ventilation valve 6 is largely limited to the fuel that is inside the valve housing 8. Accordingly, the fuel quantity that needs to be consumed for the ventilation valve to re-open is considerably less than with conventional fuel tanks.

In a first practical example shown in FIG. 3, the connecting channel K has positioned above all other wall openings 17 an uppermost wall opening 17a that also forms the outlet opening 22 mentioned above. As long as the level 24 of the fuel 23 is below the wall opening 17a during refilling, the fuel levels in the tank interior 13 and in the housing interior remain the same. However, as soon as the fuel level 24 rises so much that the wall opening 17a is flooded by fuel, the fuel level can only rise very little—if at all—beyond the ventilation valve 11, i.e. inside the tank interior 13, because the gas cushion 31 located above the fuel has no connection to the ambient air and a counter pressure starts building up inside the tank. However, the valve interior 12 is still connected to the ambient air through the ventilation opening 11, so fuel can flow into the valve interior 12 through the wall openings 17 lying geodetically lower than the wall opening 17a. When the fuel has reached the fuel the closing level 27 (which adjusts only within the valve housing 8), the sealing element 21 closes the ventilation opening 11. Once this has occurred, fuel reaching the fuel tank will lead to a pressure increase inside the valve interior 12 and tank interior 13 or in the respective gas cushions 31 and 31a, which causes the fuel level to rise inside the filling pipe 1a and eventually leads the pump nozzle to turn itself off. As soon as this happens, the level within the valve housing 8 has risen to the turn-off level 32. Outside, the considerably lower fuel level 24 adjusts itself.

It will only be possible to reopen the ventilation opening 11 when the fuel level in the valve interior 12 has dropped to the opening level 28. However, compared to the conventional fuel tank described above, a substantially lower fuel quantity must be consumed, namely only so much for the fuel level 24a outside the valve housing 8 to drop enough and allow the gas cushion 31a to be connected to valve interior 12 via the wall opening 17a. Only then will the level difference between the valve interior 12 and the tank interior 13 be compensated. In this case, the opening level 28 adjusts itself within the ventilation valve 6 or remains below it and the float 19 releases the ventilation opening 11. Outside the ventilation valve 6, i.e. in the tank interior, there exists the corresponding fuel level. According to these conditions (especially the pressure conditions inside the tank) and also depending on whether the tank has an operational ventilation of the type mentioned above or not, it could also be possible for the fuel level (turn-off level 32) to drop within the valve housing 8, and in this case there would be the same level inside and outside the valve housing 8, such as the one corresponding to the fuel level 24a. If this one is above the turn-off level—for example, in the height difference D—then a fuel volume resulting from the height difference D and the tank's cross-sectional area minus the volumes displaced by the valve housing 8 and the float 19 must be taken out of the tank until it reaches the turn-off level 28.

The compensation of the levels mentioned above or the dropping of the fuel level in the valve housing 8 to the opening level 28 is additionally supported while the vehicle is running because the motion of the fuel moving back and forth releases the wall opening 17a for short periods. An especially fast re-opening of the ventilation valve 6 is reached when the wall opening 17a or the outlet opening 22 are arranged, if possible, right under the opening level 28.

Another possibility to make the connecting channel K mentioned above a reality would be to shape it like a space arranged outside the valve interior 12 and delimited by a wall connected fluidically with the tank interior 13 through at least one outlet opening 22 and with the valve interior 12 through at least an uppermost wall opening 17b positioned above other wall openings 17. Thus, the only connection that the space would have to the tank interior 13 would be at least one outlet opening 22.

Figure 4:
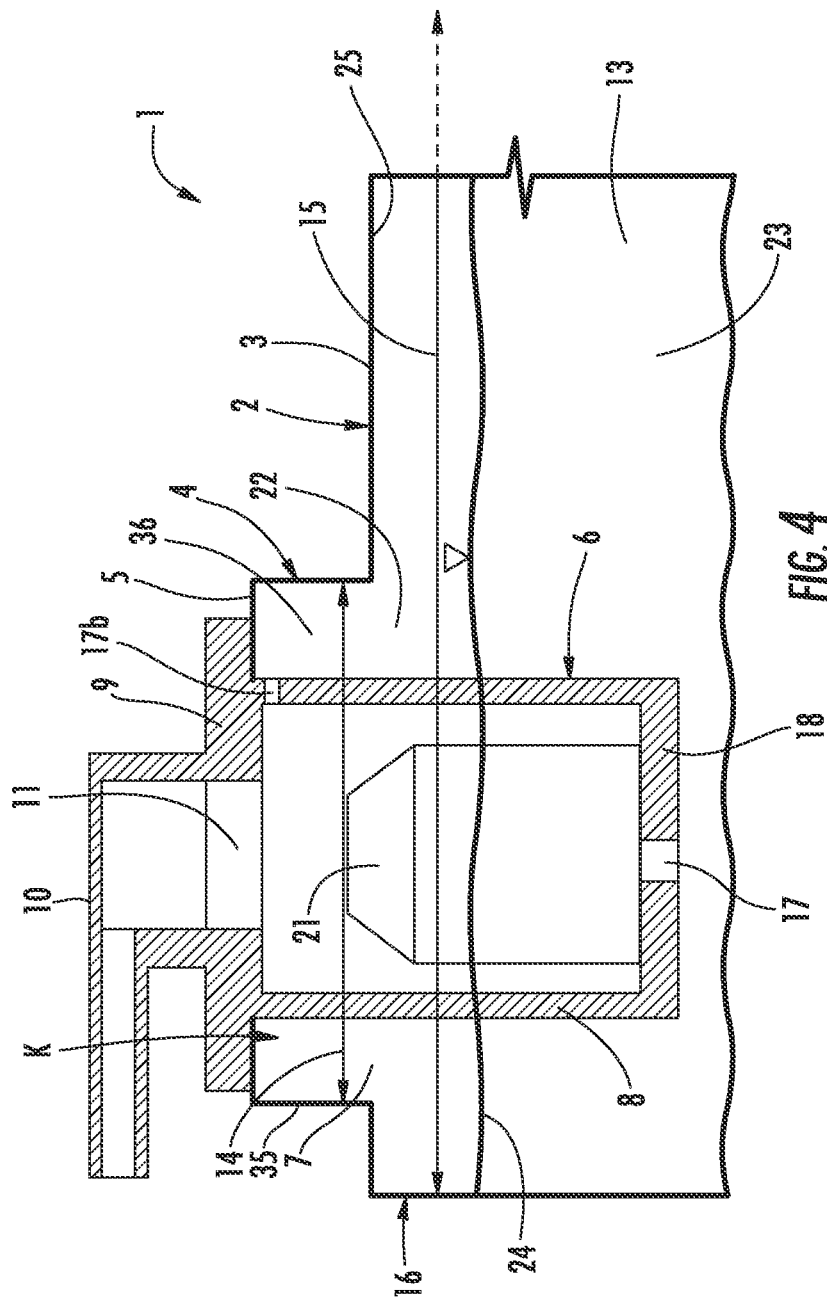
FIG. 4 A second practical design example of a fuel tank according to the present disclosure with an opened ventilation opening.
Figure 5:
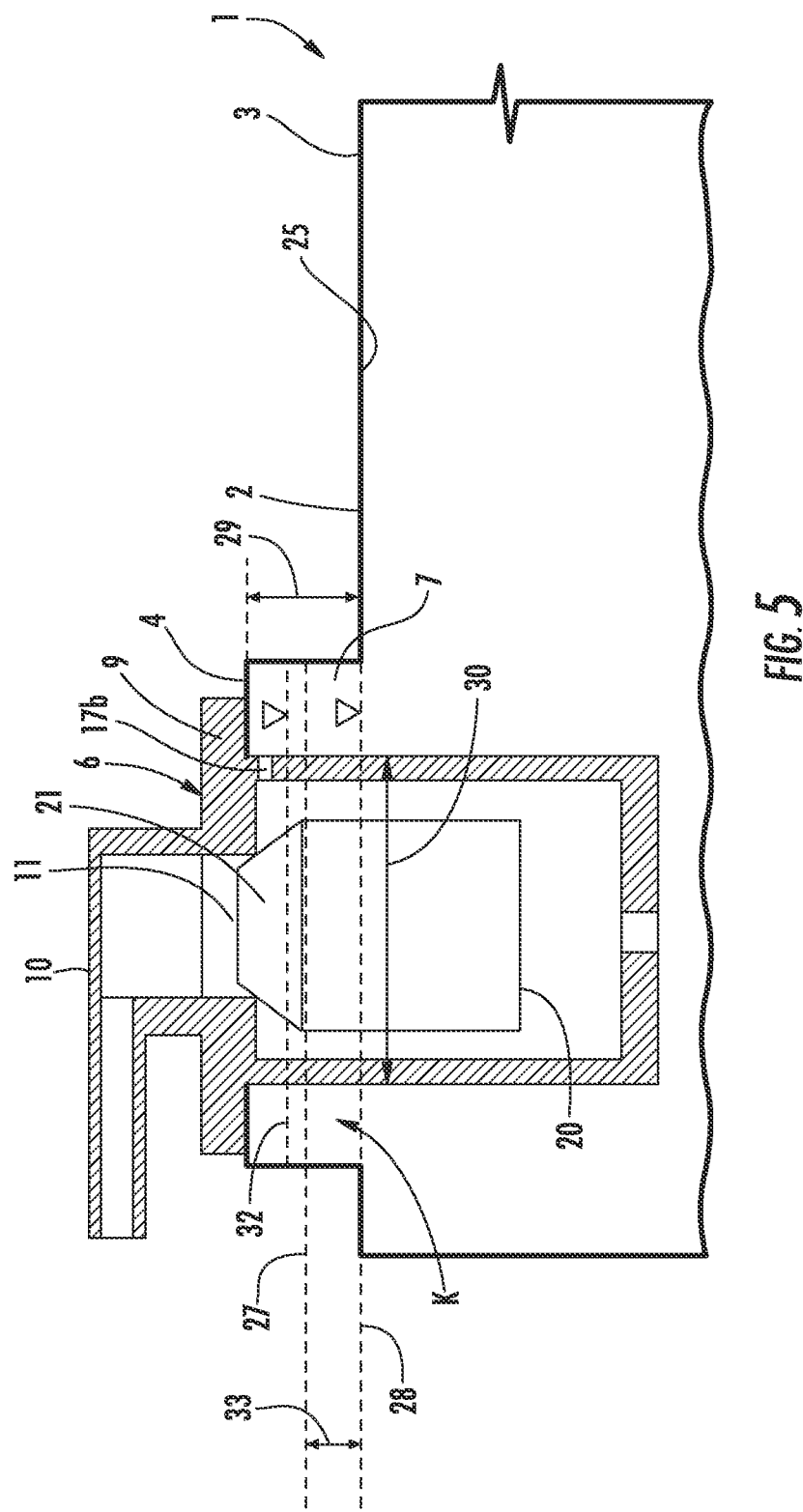
FIG. 5 The fuel tank shown in FIG. 4, but with a closed ventilation opening.

In the practical example shown in FIGS. 4 and 5, the tank has a dome 4 projecting from its upper side with an upper wall 5. The ventilation valve 6 reaches through the wall 5 and a flange 9 supports the valve against the wall. The mass and volume of the float 19 are arranged in such a way that when the float 19 is in its closed position, the closing level 27 is arranged inside the dome 4. The inner cross-sectional area 14 of the dome 4 is significantly smaller than the inner cross-sectional area 15 of the fuel tank 1. The ring space 36 located between the dome 4 and the valve housing 8 is the space formed by the connecting channel K mentioned above. The lower side of the ring space is connected with the tank interior 13 through the outlet opening 22. The section of the valve housing 8 that extends into the dome 4 is broken through by at least an uppermost wall opening 17b located above the closing level 27. The dome 4 has, for example, a cylindrically shaped lateral wall 35.

During refilling, the level 24 of the fuel 23 rises and eventually causes the float 19 to float on the surface. The fuel reaches the valve interior 12 through the openings 17. The fuel 23 flowing through the filling pipe 1a (FIGS. 1 and 2) displaces the gas in the tank interior 13 via the ventilation opening 11 and the connecting piece 10. After the level 24 of the fuel has reached the underside 25 of the wall 2 of the fuel tank 1 and the outlet opening 22, the fuel can rise only within the ring space 36 and displace the gas found therein through the wall opening 17b and the ventilation opening 11. Due to the wall openings 17 found above the wall opening 17b, the fuel simultaneously reaches the valve interior 12. In this case, it is advantageous for the wall openings 17 and 17b to be placed so the fuel inside the valve interior 12 will largely rise as fast as the fuel outside the ventilation valve 6. If the fuel level in the valve interior 12 rises too slowly, the fuel could reach the valve interior 12 through the wall opening 17a before the float 19 closes the ventilation opening 11. Then, the fuel could be carried away with the gas flow passing through the ventilation opening and reach the activated carbon filter or even the surroundings. If the fuel starts rising too fast inside the valve interior, there is the possibility that the ventilation opening 11 will close before the fuel inside the tank interior 13 has risen to the upper tank wall.

As soon as the closing level 27 in the valve interior 12 has been reached, the float 19 will close the ventilation opening 11 with its sealing element 21. As described above, the tank can still be filled with a certain quantity of fuel before the pump nozzle turns itself off. The level in the valve interior 12 has now risen to the turn-off level 32. In order to lower the fuel level within the valve to the opening level 28, only a small quantity of fuel must be consumed compared to conventional fuel tanks (FIGS. 1 and 2)—roughly the fuel quantity contained between the turn-off level 32 and the opening level 28 in the ring space 36 and in the valve interior.

It must be mentioned here that the closing level 27 and the turn-off level 32 are not undetermined, non-reproducible details. Rather, the mentioned levels should be regarded as geometric heights that can be estimated both empirically and through calculation.

Figure 6:
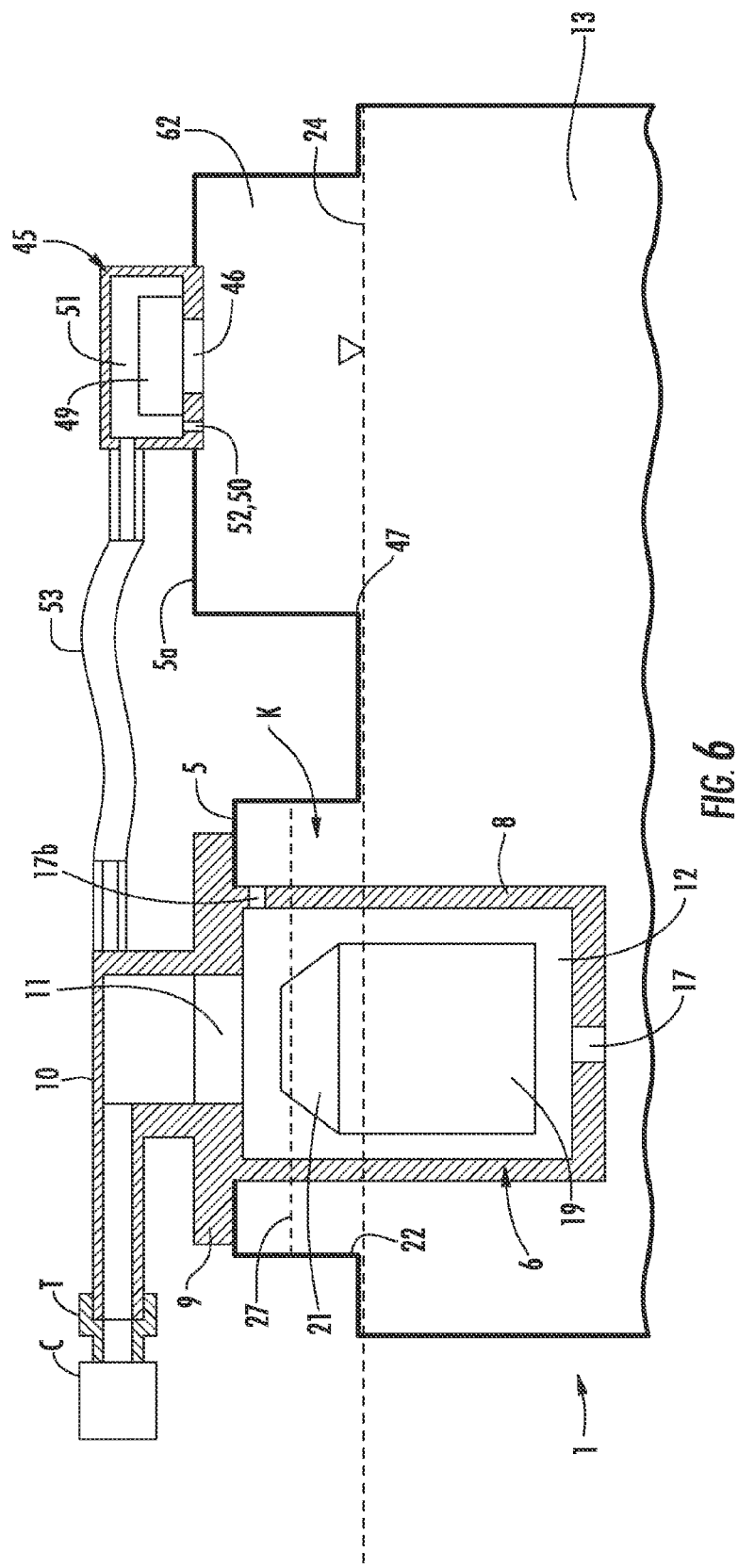
FIG. 6 A third practical design example of a fuel tank according to the present disclosure with an opened ventilation opening.
Figure 7:
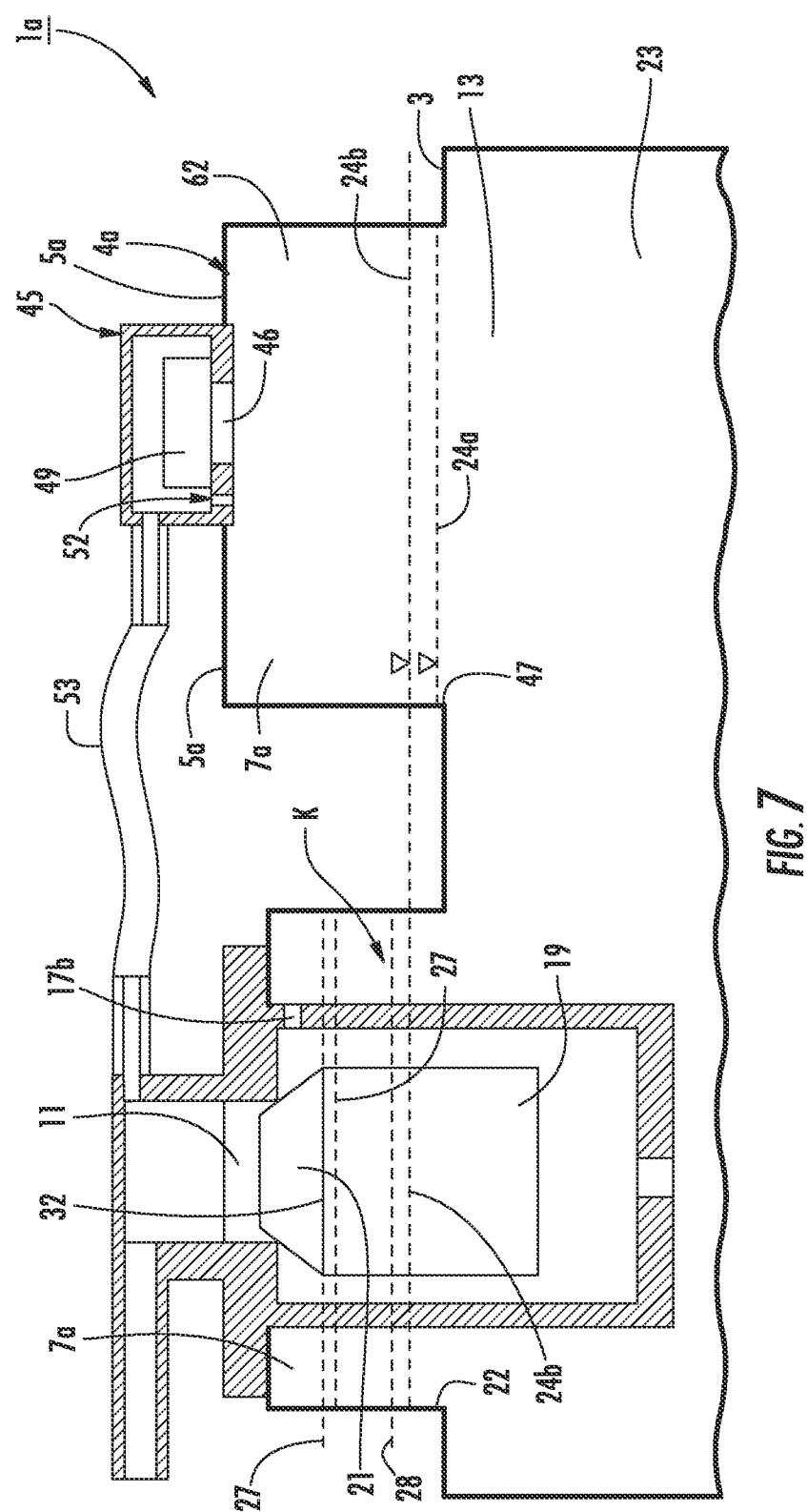
FIG. 7 The fuel tank shown in FIG. 6, but with a closed ventilation opening.

In the practical example shown in FIGS. 6 and 7, the fuel tank 1 has a second dome 4a with an upper wall 5a projecting from its upper side 3 that is interspersed with an opening 46 closed by a pressure-keeping valve 45. The interior of the dome 41 is connected to the tank interior 13 via an outlet opening 47 arranged below the closing level 27 of the ventilation valve 6 assigned to the first dome 4. In addition, outlet opening 47 runs roughly along a common plane together with the outlet opening 22 of the first dome 4.

During refilling, the fuel 23 starts rising and reaches more or less simultaneously the outlet openings 22 and 47 of both domes 4 and 4a. Owing to the pressure-keeping valve 45 in the second dome 4a that has been designed, for example, to overlap the opening 46 with a weighted sealing element 49, the gas found in the second dome 4a cannot flow out through the opening 46. Thus, a further rising of the fuel 23 in the dome 4a by increasing gas counter pressure is prevented or only possible in a very limited way. The pressure-keeping valve 45, for example, is adjusted to an opening pressure of 40 hPa. Due to the relatively large ventilation opening 11 in the first dome 4, the fuel can rise unhindered and lift the float 19. The interior 62 of the dome 4a is connected to the surroundings via a nominal leakage channel 52 whose flow cross-section is considerably smaller than the flow cross-section of the ventilation opening 11. The nominal leakage channel 52 is a bore hole 50 located in the housing of the pressure-keeping valve 45 whose interior 51 connects to the interior 62 of the dome 4a. A connecting pipe 53 connects the interior 51 of the pressure-keeping valve 45 with the connecting piece 10 of the ventilation valve 6. Therefore, the gases escaping the fuel tank 1 through the connecting pipe 53 do not reach the surroundings directly either, but the activated carbon filter (C) filters out the fuel components. Due to the large cross-sectional differences of the nominal leakage channel 52 and the ventilation opening 11, the fuel rises faster in the first dome 4 and finally reaches the turn-off level 27. Meanwhile, the fuel level 24a in the second dome 4a has risen only slightly. The flow cross-section of the nominal leakage channel 52 has been designed so that once a time period of about several seconds has elapsed after the pump nozzle has tuned off the same fuel level 24b, it adjusts itself both in the first dome 4 and in the second dome 4a. Both domes 4 and 4a have been advantageously designed so the common fuel level 24b adjusts itself to a height level below the opening level 28. In this case, the float 19 is in a position that can release the ventilation opening 11 and soon enough a state has been reached where the ventilation opening 11 is released and a re-filling is basically possible. This means that even a very small fuel consumption for only short drives is not paid by the next customer or rental car agency. The mentioned embodiment also ensures at least one re-fill, for example, for rounding up the price to be paid for fuel to an even number. The second dome 4a has been functionally designed for accepting a higher fuel quantity with the same filling height compared to the first dome 4. Therefore, the fuel quantity that continues to flow out of the first dome 4—which roughly corresponds to the fuel volumes that are between the turn-off level 32 and the closing level 28—causes the level to increase only relatively slightly in the second dome 4a. The design of both domes 4 and 4a could be such that the level 24b shown in FIG. 7 is reached only after several subsequent refills. Consequently, the second dome 4a can be seen as a storage container for the fuel volume that continues to flow from the first dome. So that no fuel can reach the surroundings via the pressure-keeping valve 35 if the vehicle turns over in an accident, a roll-over function can be used—in other words, the corresponding valve (for example, a roll-over valve not shown) closes the opening 46 from the inside.

Figure 8:
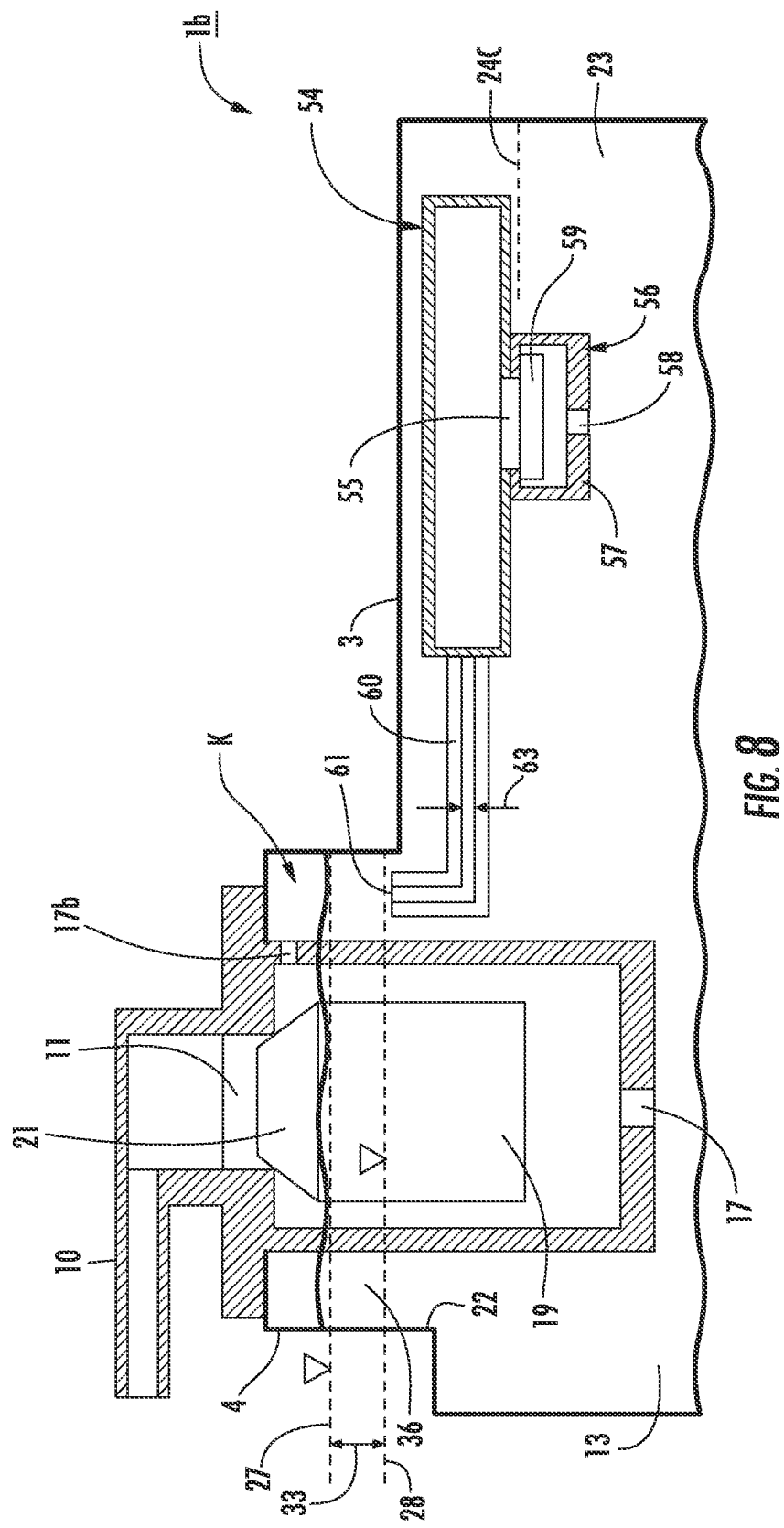
FIG. 8 A fourth practical design example of a fuel tank according to the present disclosure.

A storage container that corresponds to dome 4a can also be designed in another way, however. The design shown in FIG. 8 illustrates this example. Inside the tank interior 13 of the fuel tank having only one dome 4 is a separate storage container 54. An outflow opening 55 can be used on the underside of the storage container 54 or for its lowest spot that is controlled by a blocking valve 56 arranged on the outer side of the storage container 54. However, the blocking valve 56 can also be positioned within the storage container 54. The lower region of the housing wall 57 of the blocking valve 56 is interspersed with at least one opening 58 so fuel can flow in. A slab-shaped sealing element 59, for example, has been arranged on the blocking valve 56 so the fuel that has reached it through the valve is raised and pressed against the opening 55 or a sealing seat circumscribing it. In the fuel level 24c indicated in FIG. 8, the outflow opening 55 is closed so no fuel can flow into the storage container 54, which is arranged outside the dome 4 but fluidically connected to the dome via a connecting conduit 60 that ends in the dome 4 or in the ring space 36 delimited by it with an intake opening 61 arranged on a height level that corresponds roughly to the opening level 28 or just below this level.

When during refueling the fuel has risen all the way to the turn-off level 32 and the pump nozzle has turned itself off, the fuel volume located above the intake opening 61 of the connecting channel 60 flows into the storage container 54. The latter has, for example, a large storage volume compared to the fuel volume that is flowing into it, so the pressure increase within it due to the displaced gas volume is low, thus allowing a practically unhindered fuel inflow. However, it is advantageous for the storage container 54 to be connected to a ventilation system of the fuel tank 1—for example, to the connecting piece 10, with a ventilation conduit (not shown). The outflow speed of the fuel quantity remaining above the intake opening 61 can be controlled via the flow cross-section 63 of the connecting conduit 60 (for example, set to a certain time period that will allow refueling once it has elapsed).

Figure 9:
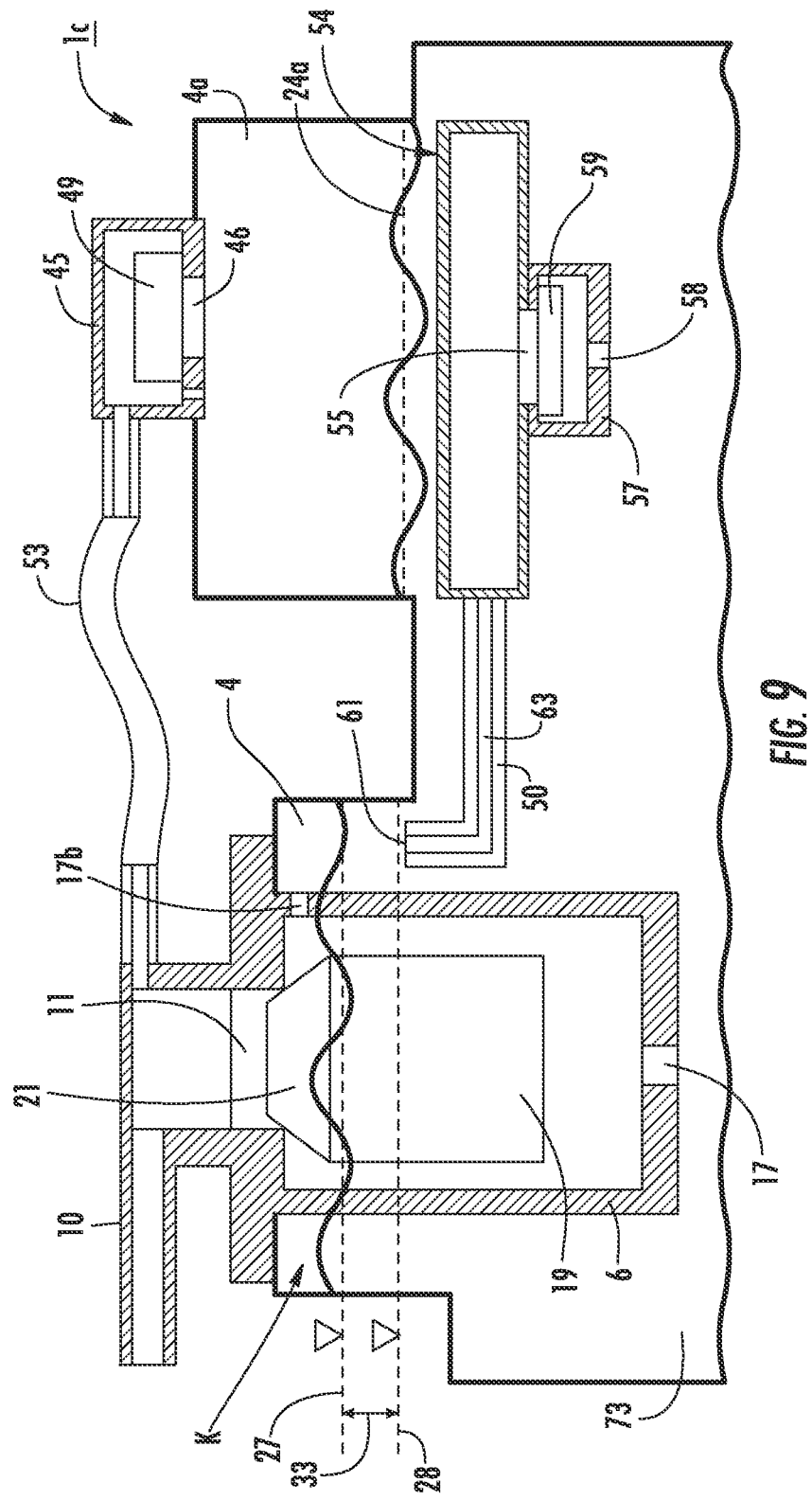
FIG. 9 A fifth practical design example of a fuel tank according to the present disclosure.

The fuel tank 1 shown in FIG. 9 is a combination of the practical example shown in FIGS. 7 and 8. Since its functional principles are present in a combined way, we can refer to the embodiments described above. A design according to FIG. 9 could be useful if a greater number of refueling steps is allowed and the storage volume necessary for space reasons can neither be made available through a second dome 4a nor through a sole storage container 54.

Figure 10:
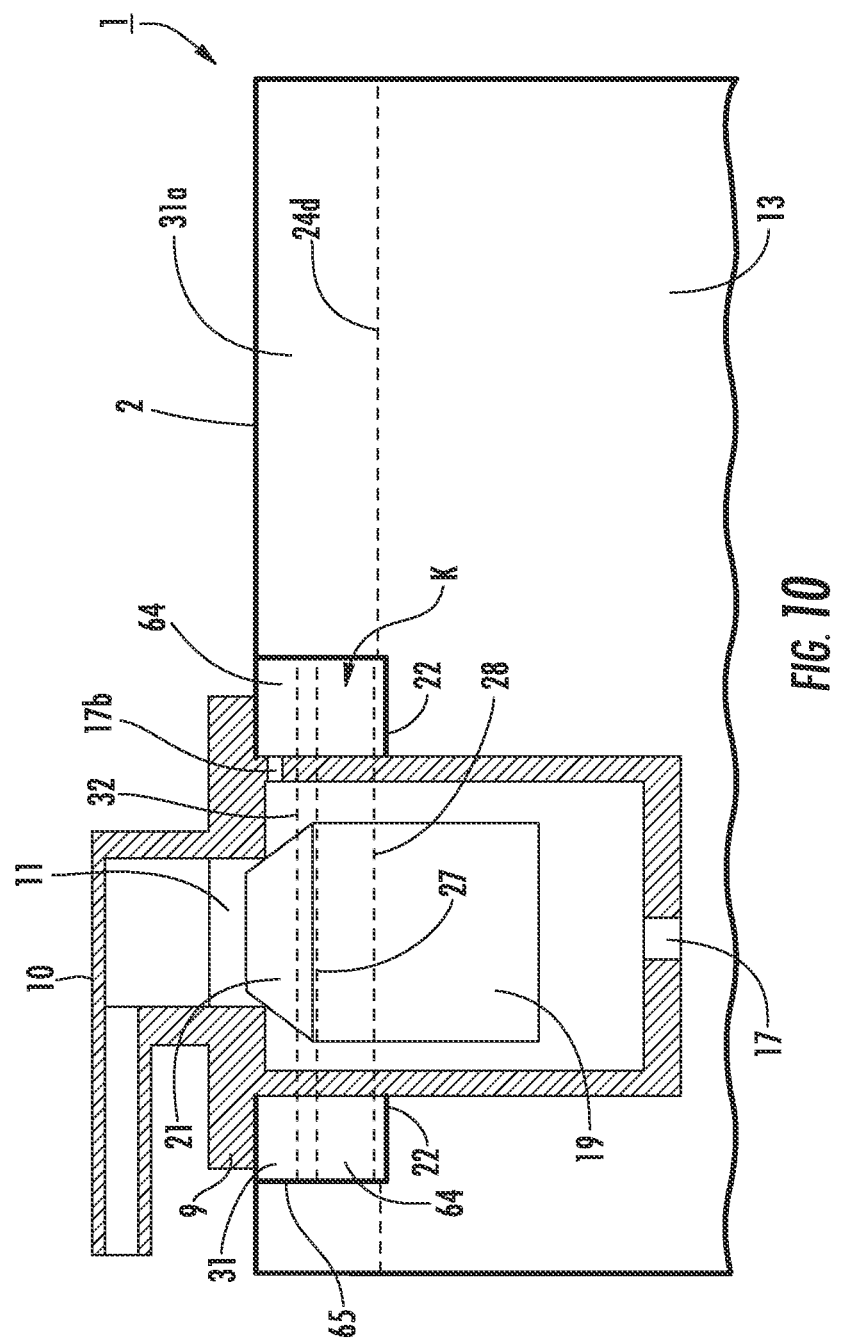
FIG. 10 A sixth practical design example of a fuel tank according to the present disclosure.

FIG. 10 shows a practical example where the connecting channel K is also formed by a ring space 64 that circumscribes an upper longitudinal section of the valve housing 8. This is a situation similar to the one shown in FIG. 4—the practical example of the fuel tank—where the dome 4 has a ring space 36 (i.e., is located above the upper tank wall 5). In the case of the tank shown according to FIG. 10, the ring space 64 is delimited by a wall encompassing the ventilation valve 6 with a radial separation that can be made as a cylindrically mold-shaped ring wall 65, for example. This ring wall 65 extends away from the upper wall 5 of the fuel tank 1. However, it is also possible for the ring wall 65 not to be connected to the upper tank wall 5 but instead to a part of a bell-shaped body (not shown) attached to the exterior of the valve housing 8. An uppermost wall opening 17b is found on the wall of the valve housing 8, and in this case the former has been placed on a height level above the closing level 27. The underside of the ring space 64 is open and connects to the tank interior 13 through an outlet opening 22.

When the fuel level starts rising during refueling, it will reach the outlet opening 22 right before the refueling process is completed. Because the gas cushion 31a located outside the ring wall 65 has now been separated from ambient air, the fuel outside the ring wall 65 can only rise slightly and as soon as the pump nozzle turns itself off a certain level state 24d is reached. On the other hand, the fuel keeps rising inside the valve housing 8 and in the ring space 64 so the closing level 27 and finally the turn-off level 32 are reached. So the fuel level in the valve interior 12 can drop to the opening level to allow the ventilation opening 11 to be released, only very little fuel consumption is necessary for the refueling process that follows vehicle use. It suffices for level 24d to drop enough so it can release the outlet opening 22. Then, the fuel level will drop simultaneously in the valve interior 12 and ring space 64, in which case the opening level 28 that releases the ventilation opening 11 is finally reached. Needless to say, it is also possible for the fuel level in the valve housing 8 to drop initially to a level corresponding to the fuel level 24d of the tank interior 13.

While preferred embodiments of the disclosed subject matter have been described using specific terms, such description is for illustrative purposes only, and it is to be understood that changes and variations may be made without departing from the spirit or scope of the disclosure.

The invention claimed is:

1. A fuel tank for a vehicle comprising:
   a tank wall defining an upper opening;
   a ventilation valve including a valve housing and a ventilation opening placed in the upper opening of the tank wall and projecting into an interior of the fuel tank, a wall of the valve housing defining at least one wall opening between an interior of the valve housing and the interior of the fuel tank;
   a float arranged in the interior of the valve housing that can be moved from a resting position to a closing position, the float having a sealing element on its upper end, the float being in a lower position in the valve housing when it is in its resting position and the sealing element spaced from the ventilation opening, the float, when in a closing position, closing the ventilation opening with the sealing element as soon as a fuel closing level is reached during fueling; and
   a connecting channel located between the valve housing interior and the tank interior that ends in the tank interior with an outlet opening placed below the fuel closing level, wherein the outlet opening is located above all of the at least one wall openings in the valve housing, the connecting channel including a chamber arranged in the fuel tank and delimited by a wall, the connecting channel lying outside the valve housing interior that is fluidically connected to the tank interior through at least an outlet opening and to the valve interior through at least an uppermost wall opening of the valve housing positioned above all of the at least one wall openings and above the closing level, the chamber being formed by a dome that has an upper wall that protrudes from an upper side of the fuel tank, wherein the ventilation valve is mounted in an opening in the upper wall.

2. The fuel tank according to claim 1, wherein the connecting channel is formed by at least an uppermost wall opening positioned above all of the at least one wall openings.

3. The fuel tank according to claim 1, wherein the chamber circumferentially encompasses at least part of the valve housing.

4. The fuel tank according to claim 3, wherein the chamber has a wall section that encompasses the valve housing at least partly with a radial separation, and a lower edge of the wall section delimits the outlet opening together with an outer side of the valve housing.

5. The fuel tank according to claim 1, wherein a second dome that has an upper wall that protrudes from the upper side of the fuel tank, the second dome being interspersed with a opening that can be closed by a pressure-keeping valve, wherein an interior of the second dome is connected to the tank interior through an outlet opening positioned below the fuel closing level and wherein the interior of the second dome is connected with the ambient air via a nominal leakage channel whose flow cross-section is less than the flow cross-section of the ventilation opening of the ventilation valve.

6. The fuel tank according to claim 5, wherein the nominal leakage channel ends in a ventilation system of the fuel tank encompassed by an activated carbon canister.

7. The fuel tank according to claim 1, wherein a storage container placed in the tank interior is connected to an intake opening arranged below the closing level that has a connecting channel ending in the interior of the storage container, wherein a lower wall of the storage container is interspersed with an outflow opening that can be closed with a blocking valve arranged on the storage container.

8. The fuel tank according to claim 7, wherein the blocking valve is controlled by a float.

9. The fuel tank according to claim 7, wherein the storage container is connected to the atmosphere through a ventilation channel.

10. The fuel tank according to claim 9, wherein the ventilation channel ends in a ventilation system of the fuel tank that is encompassed by an activated carbon canister.

11. A low refilling hysteresis fuel tank, the fuel tank comprising:
   a fuel tank having a tank wall defining a tank interior, a filling opening attached to the filling wall, and an upper opening defined through the tank wall;
   a ventilation valve having a valve housing and positioned through the upper opening, the valve housing defining a ventilation opening therethrough in communication with an exterior of the fuel tank, the valve housing having a wall through which at least one wall opening extends;
   a float being arranged in an interior of the valve housing, the float moveable from a lower resting position to a higher closing position when fuel supplied to the fuel tank through the filling opening reaches a fuel closing level, the float having a sealing element on an upper end, and wherein the sealing element closes the ventilation opening as soon as the fuel closing level is reached, wherein the sealing element releases the ventilation opening when the float is in its resting position; and
   a hysteresis reducing connecting channel positioned between the interior of the valve and the interior of the tank and ending in the tank interior with an outlet opening positioned below the fuel closing level and positioned above the at least one wall openings, the float moving away from the closing position once the fuel level within the valve housing drops below the fuel closing level, the connecting channel including a chamber arranged in the fuel tank and delimited by a wall, the connecting channel lying outside the valve housing interior that is fluidically connected to the tank interior through at least an outlet opening and to the valve interior through at least an uppermost wall opening of the valve housing positioned above all of the at least one wall openings and above the closing level, the chamber being formed by a dome that has an upper wall that protrudes from an upper side of the fuel tank, wherein the ventilation valve is mounted in an opening in the upper wall.

12. The fuel tank according to claim 11, wherein the chamber circumferentially encompasses at least part of the valve housing.

13. The fuel tank according to claim 12, wherein the chamber has a wall section that encompasses the valve housing at least partly with a radial separation, and a lower edge of the wall section delimits the outlet opening together with an outer side of the valve housing.

14. The fuel tank according to claim 11, wherein a second dome that has an upper wall that protrudes from the upper side of the fuel tank, the second dome being interspersed with a opening that can be closed by a pressure-keeping valve, wherein an interior of the second dome is connected to the tank interior through an outlet opening positioned below the fuel closing level and wherein the interior of the second dome is connected with the ambient air via a nominal leakage channel whose flow cross-section is less than the flow cross-section of the ventilation opening of the ventilation valve.

* * * * *